United States Patent
Acero et al.

(10) Patent No.: US 7,047,047 B2
(45) Date of Patent: May 16, 2006

(54) NON-LINEAR OBSERVATION MODEL FOR REMOVING NOISE FROM CORRUPTED SIGNALS

(75) Inventors: Alejandro Acero, Bellevue, WA (US); Li Deng, Redmond, WA (US); James G. Droppo, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 10/237,163

(22) Filed: Sep. 6, 2002

(65) Prior Publication Data

US 2004/0052383 A1    Mar. 18, 2004

(51) Int. Cl.
*H04B 1/38* (2006.01)
(52) U.S. Cl. ................ 455/563; 704/231; 381/94.1
(58) Field of Classification Search ........ 455/563, 455/296; 704/231, 233, 255; 381/94.1, 381/94.2
See application file for complete search history.

(56) References Cited

U.S. PATENT DOCUMENTS

| | | | |
|---|---|---|---|
| 5,012,519 A | | 4/1991 | Adlersberg et al. ......... 381/47 |
| 5,148,489 A | * | 9/1992 | Erell et al. .................. 704/226 |
| 5,604,839 A | | 2/1997 | Acero et al. ................ 395/2.43 |
| 5,924,065 A | * | 7/1999 | Eberman et al. ........... 704/231 |
| 6,092,045 A | | 7/2000 | Stubley et al. .............. 704/254 |

OTHER PUBLICATIONS

U.S. Appl. No. 10/117,142, filed Apr. 5, 2002, Droppo et al.
U.S. Appl. No. 09/688,764, filed Oct. 16, 2000, Deng et al.
U.S. Appl. No. 09/688,950, filed Oct. 16, 2000, Deng et al.
Deng et al., "Recursive noise estimation using iterative stochastic approximation for stereo-based robust speech recognition", Proc. IEEE, Automatic Speech Recognition and Understanding, pp. 81-84, Dec. 9, 2001, XP002259233.
L. Deng, J. Droppo, and A. Acero. "A Bayesian approach to speech feature enhancement using the dynamic cepstral prior," *Proc. ICASSP*, vol. I, Orlando, Florida, May 2002, pp. 829-832.
L. Deng, A. Acero, M. Plumpe, and X.D. Huang. "Largevocabulary speech recognition under adverse acoustic environments," *Proc. ICSLP*, vol. 3, 2000, pp. 806-809.
L. Deng, A. Acero, L. Jiang, J. Droppo, and XD Huang. "Highperformance robust speech recognition using stereo training data," *Proc. ICASSP*, vol. 1, 2001, pp. 301-304.

(Continued)

*Primary Examiner*—Lee Nguyen
(74) *Attorney, Agent, or Firm*—Steven M. Koehler; Westman, Champlin & Kelly, P.A.

(57) ABSTRACT

A new statistical model describes the corruption of spectral features caused by additive noise. In particular, the model explicitly represents the effect of unknown phase together with the unobserved clean signal and noise. Development of the model has realized three techniques for reducing noise in a noisy signal as a function of the model.

16 Claims, 11 Drawing Sheets

OTHER PUBLICATIONS

J. Droppo, L. Deng, and A. Acero. "Evaluation of the SPLICE algorithm on the Aurora2 database," *Proc. Eurospeech,* Sep.2001, pp. 217-220.

B. Frey, L. Deng, A. Acero, and T. Kristjansson. "ALGONQUIN: Iterating Laplace's method to remove multiple types of acoustic distortion for robust speech recognition," *Proc. Eurospeech,* Sep. 2001, pp. 901-904.

P. Moreno, B. Raj, and R. Stern. "A vector Taylor series approach for environment-independent speech recognition," *Proc. ICASSP,* vol. 1, 1996, pp. 733-736.

H. G. Hirsch and D. Pearce, "The AURORA experimental framework for the performance evalutations of speech recognition systems under noisy condidtions," in ISCA ITRW ASR2000" *Automatic Speech Recognition: Challenges for the Next Millennium*", Paris, France, Sep. 2000.

J. Droppo, A. Acero, and L. Deng, "Uncertainty decoding with SPLICE for noise robust sppech recognition," in *Proc. 2002 ICASSP,* Orlando, Florida, May 2002.

"HMM Adaptation Using Vector Taylor Series for Noisy Speech Recognition," Alex Acero, et al., Proce. ICSLP, vol. 3, 2000, pp 869-872.

"Sequential Noise Estimation with Optimal Forgetting for Robust Speech Recognition," Mohomed Afify, et al., Proc. ICASSP, vol. 1, 2001, pp 229-232.

"Nonstationary Environment Compensation Based on Sequential Estimation," Nam Soo Kim, IEEE Signal Processing Letters, vol. 5, 1998, pp 57-60.

"On-line Estimation of Hidden Markov Model Parameters Based on the Kullback-Leibler Information Measure,"Vikram Krishnamurthy, et al., IEEE Trans. Sig. Proc., vol. 41, 1993, pp 2557-2573.

"Efficient On-Line Acoustic Environment Estimation for FCDCN in a Continuous Speech Recognition System, " Jasha Droppo, et al., ICASSP, 2001.

"Robust Automatic Speech Recognition With Missing and Unreliable Acoustic Data," Martin Cooke, Speech Communication, vol. 34, No. 3, pp267-285, Jun. 2001.

"Learning Dynamic Noise Models From Noisy Speech for Robust Speech Recognition," Brendan J. Frey, et al., Neural Information Processing Systems Conference, 2001, pp 1165-1121.

"Speech Denoising and Dereverberation Using Probabilistic Models," Hagai Attias, et al., Advances in NIPS, vol. 13, 2000 pp 758-764.

"Statistical-Model-Based Speech Enhancement Systems," Proc. of IEEE, vol. 80, No. 10, oct. 1992, pp 1526.

"HMM-Based Strategies for Enhancement of Speech Signals Embedded in Nonstationary Noise," Hossein Sameti, IEEE Trans. Speech Audio Processing, vol. 6, No. 5, Sep. 1998, pp 445-455.

"Model-based Compensation of the Additive Noise for Continuous Speech Recognition," J.C. Segura, et al., Eurospeech 2001.

"A Compact Model for Speaker-Adaptive Training,"Anastasakos, T., et al., BBN Systems and Technologies, pp. 1137-1140 (undated).

"Suppression of Acoustic Noise in Speech Using Spectral Subtraction," Boll, S. F., IEEE Transactions on Acoustics, Speech and Signal Processing, vol. ASSP-27, No. 2, pp. 113-120 (Apr. 1979).

"A Spectral Subtraction Algorithm for Suppression of Acoustic Noise in Speech," Boll, S.F., IEEE International Conference on Acousitics, Speech & Signal Processing, pp. 200-203 (Apr. 2-4, 1979).

"Enhancement of Speech Corrupted by Acoustic Noise," Berouti, M. et al., IEEE International Conference on Acoustics, Speech & Signal Processing, pp. 208-211 (Apr. 2-4, 1979).

"Acoustical and Environmental Robustness in Automatic Speech Recognition," Acero, A., Department of Electrical and Computer Engineering, Carnegie Mellon University, pp. 1-141 (Sep. 13, 1990).

"Speech Recognition in Noisy Environments,"Pedro J. Moreno, Ph.D. thesis, Carnegie Mellon University, 1996.

"A New Method for Speech Denoising and Robust Speech Recognition Using Probabilistic Models for Clean Speech and for Noise," Hagai Attias, et al., Proc. Eurospeech, 2001, pp 1903-1906.

Jeff Ma and Li Deng, "A path-stack algorithm for optimizing dynamic regimes in a statistical hidden dynamic model of speech," Computer Speech and Language 2000, 1-14.

European Communication, dated Dec. 29, 2003 for EP28352-034/df.

Kristjansson T. et al, "Towards non-stationary model-based noise adaptation for large vocabulary speech recognition" 2001 IEEE International Conference on Acoustics, Speech, and Signal Processing, May 7-11, 2001, pp. 337-340, vol. 1.

J. Droppo, A. Acero and L. Deng:"A nonlinear observation model for removing noise from corrupted speech log melspectral energies", Proceedings ICSLP 2002, pp. 1569-1572.

L. Deng, J. Droppo and A. Acero: "Log-domain speech feature enhancement using sequential map noise estimation and a phase-sensitive model of the acoustic environment", Proceedings ICSLP 2002, Sep. 16-20, 2002, pp. 1813-1816.

N.B. Yoma, F.R. McInnes, and M.A. Jack, "Improving prerformance of spectral subtraction in speech recognition using a model for additive noise," IEEE Trans. On Speech and Audio Processing, vol. 6, pp. 579-582, Nov. 1998.

Y. Zhao, "Frequency-domain maximum liklihood estimation for automatic speech recognition in additive and convolutive noises," IEEE Trans. Speech and Audio Proc., vol. 8, No. 3, pages 255-266, May 2000.

H.Y. Jung et al., "On the temporal decorrelation of feature parameters for noise-robust speech recognition," in Proc. 2000 ICASSP, May 2000, vol. 8, pp. 407-416.

Y. Ephraim et al, "On second-order statistics and linear estimation of cepstral coefficients," IEEE Trans. Speech and Audio Proc., vol. 7, No. 2, pp. 162-176, Mar. 1999.

F.H.Liu, et al., "Environment normalization for robust speech recognition using direct cepstral comparison," in Proc.1994 IEEE ICASSP, Apr. 1994.

A.Acero et al., "Environmental robustnessin automatic speech recognition," in Proc. 1990 ICASSP, Apr. 1990, vol. 2, pp. 849-552.

A.Acero et al., "Robust speech recognition by normalizaiton of the acoustic space," in Proc. 1991 IEEE ICASSP, Apr. 1991, vol. 2, pp. 893-896.

P. Green et al, "Robust ASR based on clean speech models: An evaluation of missing data techniques for connected digit recognition in noise," in Proc. Eurospeech 2001, Aalborg, Denmark, Sep. 2001, pp. 213-216.

* cited by examiner

NON-LINEAR OBSERVATION MODEL FOR REMOVING NOISE FROM CORRUPTED SIGNALS

BACKGROUND OF THE INVENTION

The present invention relates to noise reduction. In particular, the present invention relates to reducing noise in signals used in pattern recognition.

A pattern recognition system, such as a speech recognition system, takes an input signal and attempts to decode the signal to find a pattern represented by the signal. For example, in a speech recognition system, a speech signal is received by the recognition system and is decoded to identify a string of words represented by the speech signal.

However, input signals are typically corrupted by some form of additive noise. Therefore, to improve the performance of the pattern recognition system, it is often desirable to estimate the additive noise and use the estimate to provide a cleaner signal.

Spectral subtraction has been used in the past for noise removal, particularly in automatic speech recognition systems. Conventional wisdom holds that when perfect noise estimates are available, basic spectral subtraction should do a good job of removing the noise; however, this has been found not to be the case.

Standard spectral subtraction is motivated by the observation that noise and speech spectra mix linearly, and therefore, their spectra should mix according to $$|Y[k]|^2 = |X[k]|^2 + |N[k]|^2$$

Typically, this equation is solved for a $|X[k]|^2$, and a maximum attenuation floor F is introduced to avoid producing negative power special densities.

$$|\hat{X}[k]|^2 = |Y[k]|^2 \max\left(\frac{|Y[k]|^2 - |N[k]|^2}{|Y[k]|^2}, F\right) \quad \text{EQ. 1}$$

Several experiments were run to examine the performance of Equation 1 using the true spectra of n, and floors F from $e^{-20}$ to $e^{-2}$. The true noise spectra were computed from the true additive noise time series for each utterance. All experiments were conducted using the data, code and training scripts provided within the Aurora 2 evaluation framework described by H. G. Hirsch and D. Pearce in "The Aurora Experimental Framework for the Performance Evaluations of Speech Recognition Systems Under Noisy Conditions," ISCA ITRW ASR 2000 "Automatic Speech Recognition: Challenges for the Next Millennium", Paris, France, September 2000. The following digit error rates were found for various floors:

| FLOOR | | | | |
|---|---|---|---|---|
| $e^{-20}$ | $e^{-10}$ | $e^{-5}$ | $e^{-3}$ | $e^{-2}$ |
| 87.50 | 56.00 | 34.54 | 11.31 | 15.56 |

From the foregoing, it is clear that even when the noise spectra is known exactly, spectral subtraction does not perform perfectly and improvements can be made. In light of this, a noise removal technique is needed that is more effective at estimating the clean speech spectral features.

SUMMARY OF THE INVENTION

A new statistical model describes the corruption of spectral features caused by additive noise. In particular, the model explicitly represents the effect of unknown phase together with the unobserved clean signal and noise. Development of the model has realized three techniques for reducing noise in a noisy signal as a function of the model.

Generally, as an aspect of the present invention and utilized in two techniques, a frame of a noisy input signal is converted into an input feature vector. An estimate of a noise-reduced feature vector uses a model of the acoustic environment. The model is based on a non-linear function that describes a relationship between the input feature vector, a clean feature vector, a noise feature vector and a phase relationship indicative of mixing of the clean feature vector and the noise feature vector. Inclusion of a mathematical representation of the phase relationship renders an accurate model. One unique characteristic of the phase relationship is that it is in the same domain as the clean feature vector and the noise feature vector. Another separate distinguishing characteristic is that the phase relationship includes a phase factor with a statistical distribution.

In another aspect, a method for reducing noise in a noisy input signal includes converting a frame of the noisy input signal into an input feature vector; and obtaining a noise-reduced feature vector by using an equation of the form $$\hat{x} = y + \ln|1 - e^{n-y}|$$

where y is the input feature vector and n comprises a noise estimate.

DETAILED DESCRIPTION OF ILLUSTRATIVE EMBODIMENTS

Before describing aspects of the present invention, a brief description of exemplary computing environments will be discussed.

Figure 1:
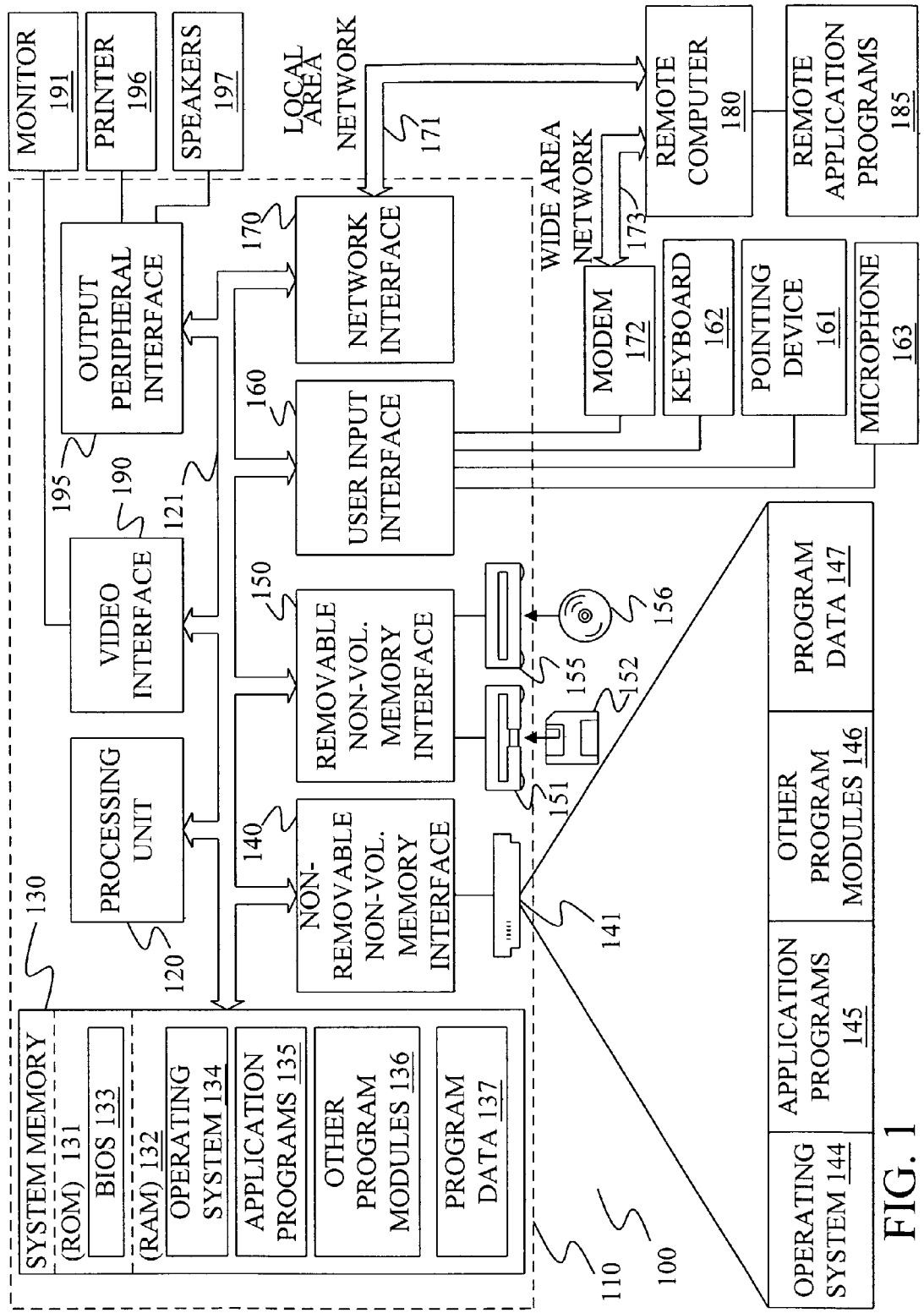
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and figures as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
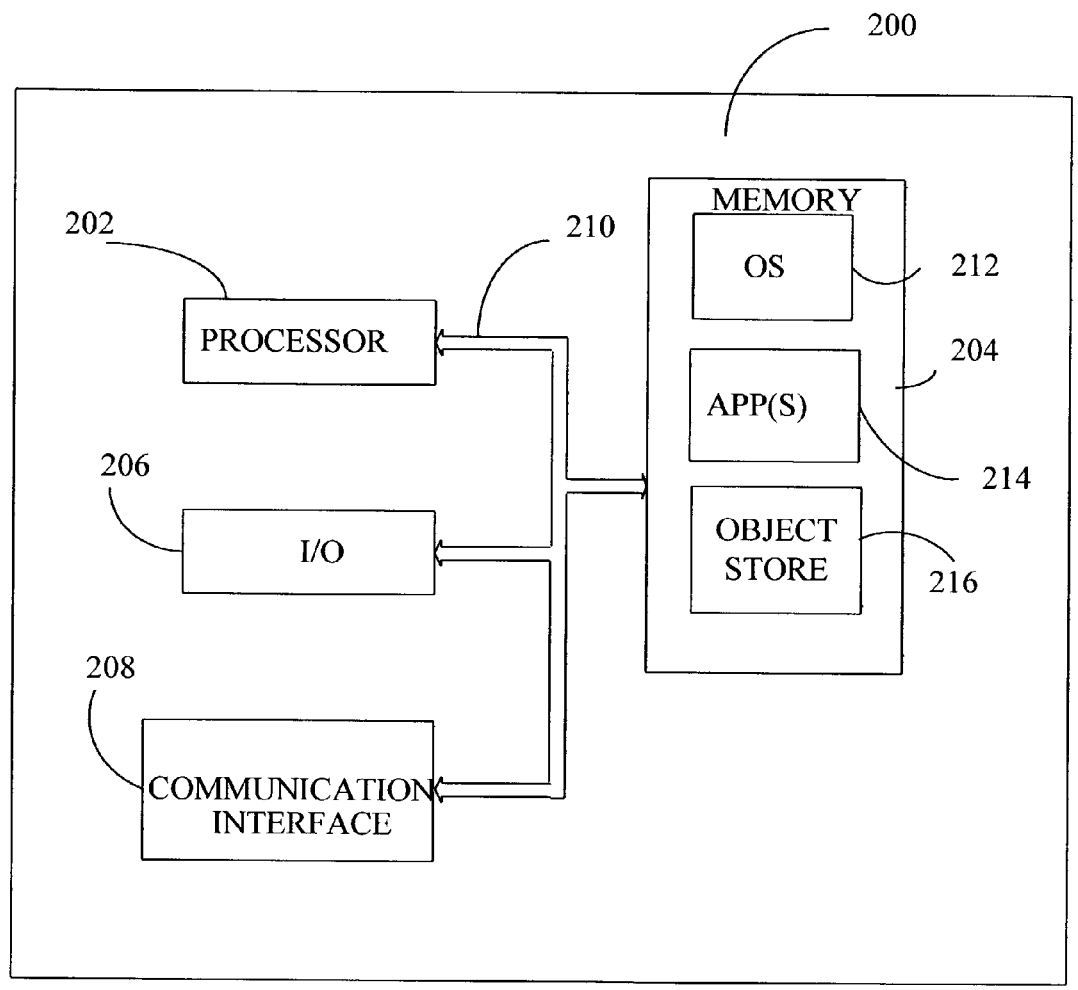
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under one aspect of the present invention, a system and method are provided that remove noise from pattern recognition signals. To do this, this aspect of the present invention uses a new statistical model, which describes the corruption to the pattern recognition signals, and in particular to speech recognition spectral features, caused by additive noise. The model explicitly represents the effect of unknown phase together with the unobserved clean speech and noise as three hidden variables. The model is used to produce robust features for automatic speech recognition. As will be described below, the model is constructed in the log Mel-frequency feature domain. Advantages of this domain include low dimensionality, allowing for efficient training in inference. Logarithmic Mel-frequency spectral coefficients are also linearly related to Mel-Frequency Cepstrum Coefficients (MFCC), which correspond to the features used in a recognition system. Furthermore, corruption from linear channels and additive noise are localized within individual Mel-frequency bins, which allows processing of each dimension of the feature independently.

As indicated above, the model of the present invention is constructed in the logarithmic Mel-frequency spectral domain. Each spectral frame is processed by passing it through a magnitude-squared operation, a Mel-frequency filterbank, and a logarithm.

Generally, the noisy or observation (Y) signal is a linear combination of speech (X) and noise (N) as represented by Y[k]=X[k]+N[k]. Accordingly, the noisy log Mel-spectral features $y_i$ can be directly related to the unobserved spectra X[k] and N[k], which can be represented as:

$$\exp y_i = \sum_k w_k^i |X[k]|^2 + \sum_k w_k^i |N[k]|^2 + \sum_k w_k^i |X[k]||N[k]|\cos\theta_k \quad \text{EQ. 2}$$

where, $w_k^i$ is the kth coefficient in the ith Mel-frequency filterbank. The variable $\theta_k$ is the phase difference between X[k] and N[k]. When the clean signal and noise are uncorrelated, the $\theta_k$ are uncorrelated and have a uniform distribution over the range $[-\pi, \pi]$.

Eq. 2 can be re-written to show how the noisy log spectral energies $y_i$ are a function of the unobserved log spectral energies $x_i$ and $n_i$.

$$\exp y_i = \exp x_i + \exp n_i + 2\alpha_i \exp\frac{x_i + n_i}{2} \qquad \text{EQ. 3}$$

$$\alpha_i = \frac{\sum_k w_k^i |X[k]||N[k]|\cos\theta_k}{\sqrt{\sum_k w_k^i |X[k]|^2}\sqrt{\sum_k w_k^i |N[k]|^2}} \qquad \text{EQ. 4}$$

$$\exp x_i = \sum_k w_k^i |X[k]|^2$$

$$\exp n_i = \sum_k w_k^i |N[k]|^2$$

As a consequence of this model, when $y_i$ is observed there are actually three unobserved random variables. The first two include the clean log spectral energy and the noise log spectral energy that would have been produced in the absence of mixing. The third variable, $\alpha_i$, accounts for the unknown phase between the two sources.

In the general case, $\alpha_i$ will be a function of X[k] and N[k]. However, if the magnitude spectra are assumed constant over the bandwidth of a particular filterbank, the definition of $\alpha_i$ collapses to a weighted sum of several independent random variables:

$$\alpha_i \approx \sum_k \frac{w_k^i}{\sum_j w_j^i}\cos\theta_k. \qquad \text{EQ. 5}$$

Figure 3A:
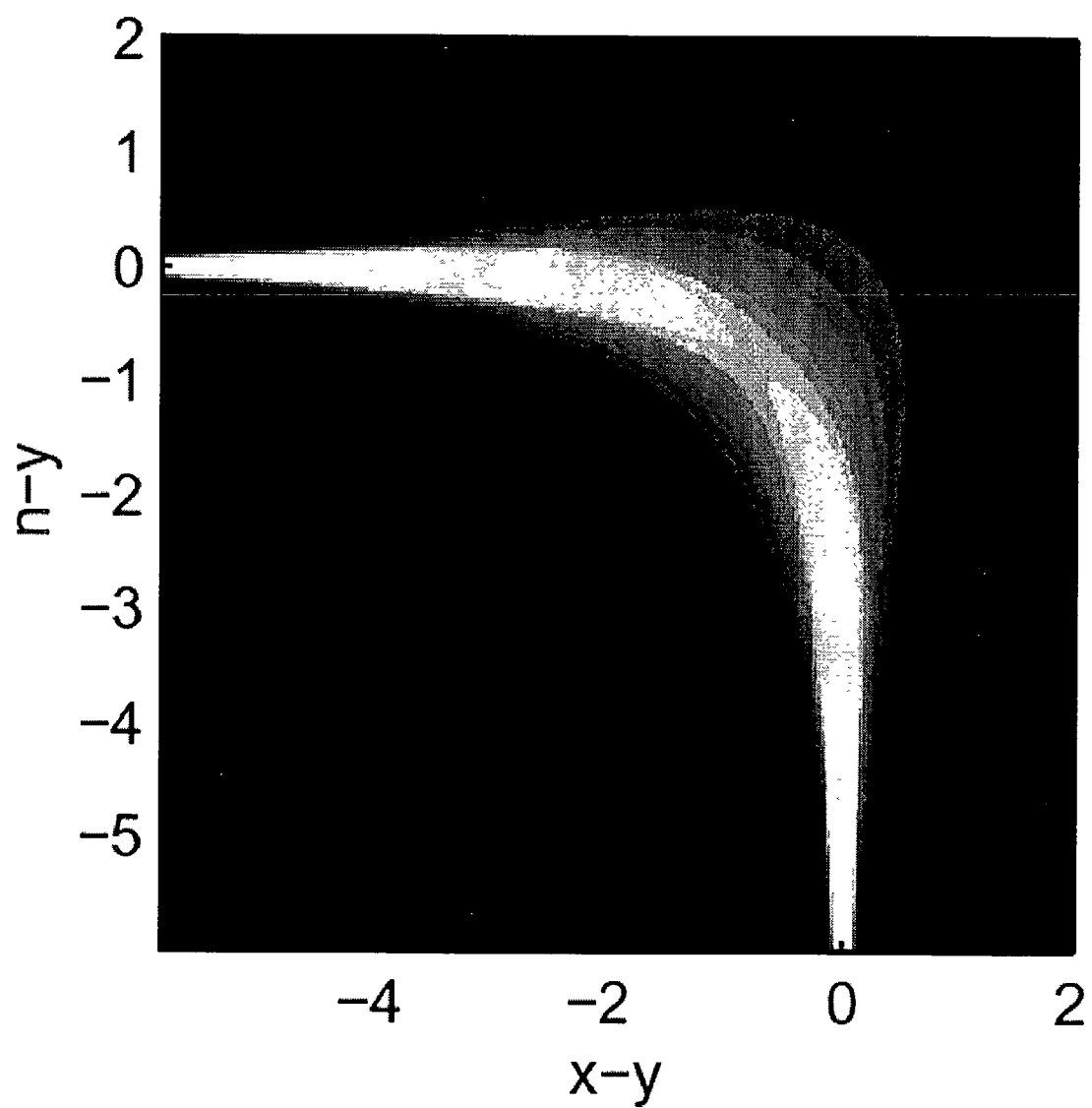
FIG. 3A is a plot of conditional observation probability p(y|x, n) with normal approximation for $p_\alpha(\alpha)$.
Figure 3B:
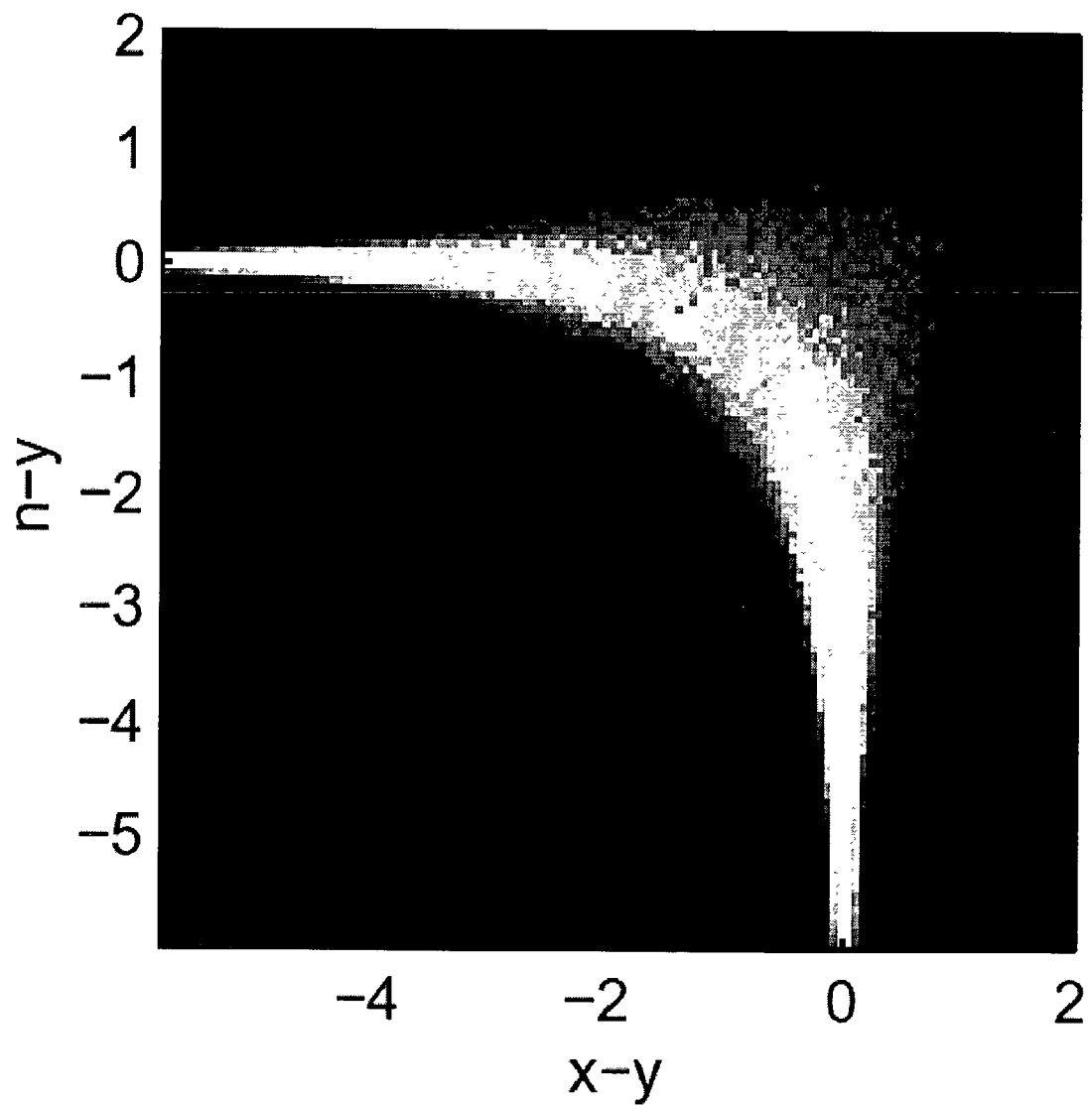
FIG. 3B is a plot of a sample distribution for a filter bank.
Figure 3C:
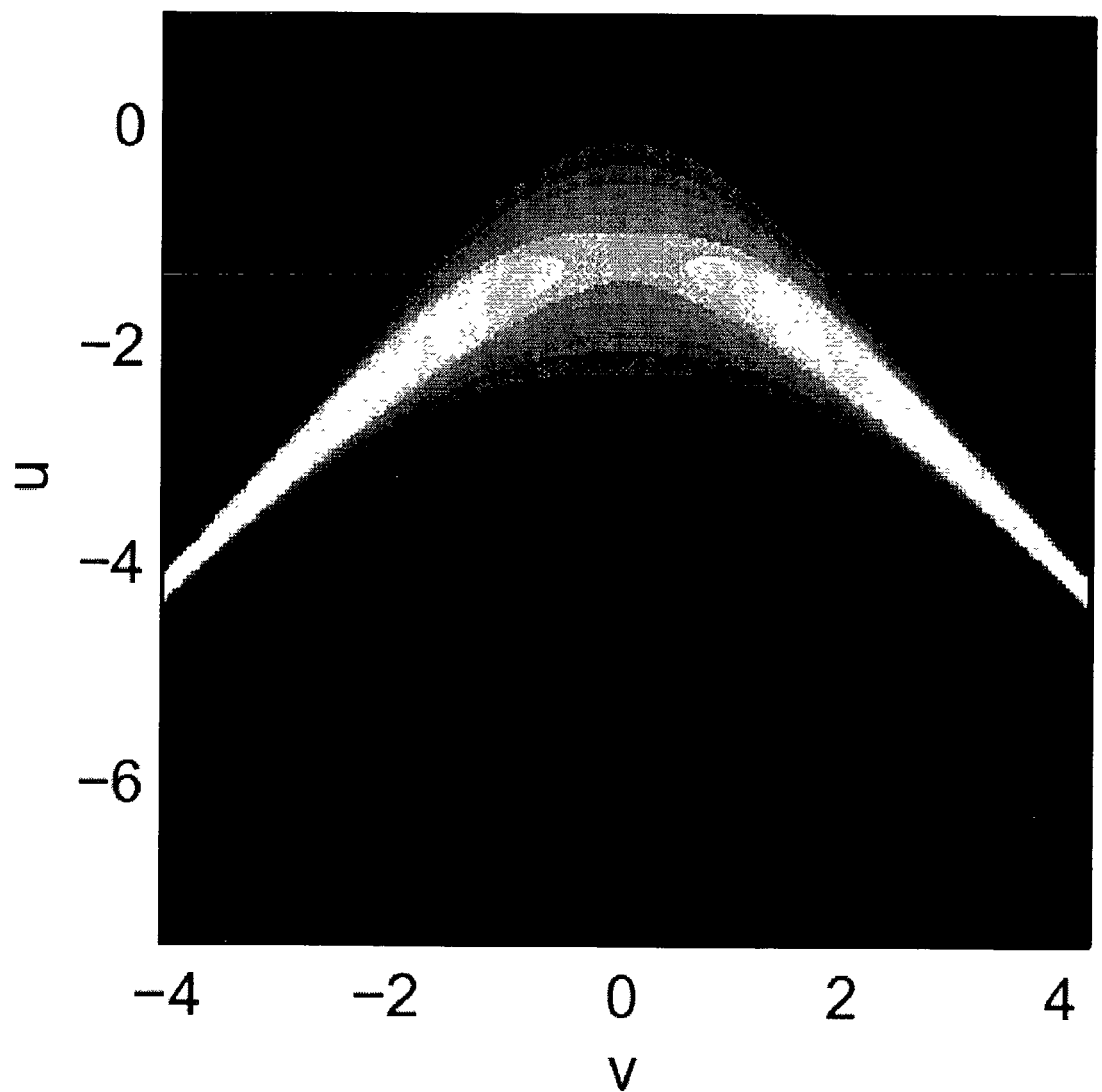
FIG. 3C is a plot of normal approximation of p(y|x, n) as a function of v.
Figure 3D:
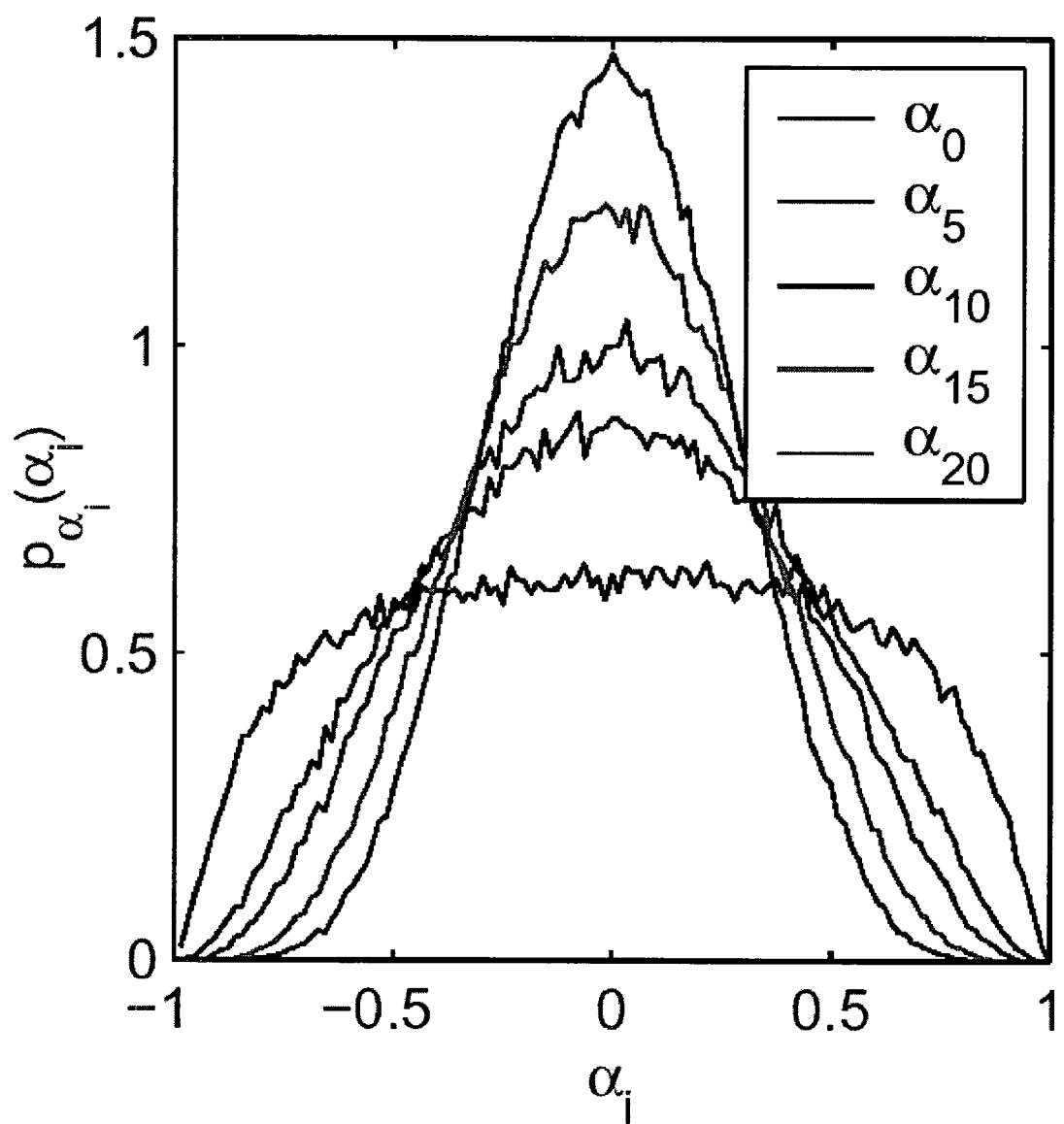
FIG. 3D is a plot of distributions of $\alpha$ for several frequency bins.

FIG. 3D shows the true distributions of $\alpha$ for a range of frequency bins. They were estimated from a set of joint noise, clean speech, and noisy speech data by solving for the unknown $\alpha$. The higher frequency, higher bandwidth filters produce $\alpha$ distributions that are more nearly Gaussian. By design, the low frequency bins in a Mel-frequency filterbank have a narrow bandwidth, and the bandwidth increases with frequency. This means that the effective number of terms in Eq. 5 also increases with frequency. As a result, a Gaussian assumption is quite bad for the lowest frequency bins, and becomes much better as the bandwidth of the filters increase. As the bandwidth increases, so does the number of effective terms in Eq. 5, and the central limit theorem begins to apply. In practice, a frequency-dependent Gaussian approximation $P_{\alpha i}(\alpha_i)=N(\alpha_i; 0, \sigma_{\alpha i}^2)$ works well.

At this point it should be noted, that the parameter $\sigma_\alpha^2$ can be estimated from a small set of training data. The estimate is the sample variance computed from all the sample values of $\alpha^{(l)}$'s (for l=1, 2, . . . L, L=the total number Mel-filter banks). A linear regression line is fit to the computed $\sigma_\alpha^2$ as a function of l.

Conditional Observation Probability

Eq. 3 places a hard constraint on the four random variables, in effect yielding three degrees of freedom. This can be expressed by solving for y and writing the conditional probability distribution, $$p(y|x,n,\alpha) = \delta\left(y - \ln\left(e^x + e^n + 2\alpha e^{\frac{x+n}{2}}\right)\right). \qquad \text{EQ. 6}$$

The conditional probability p(y|x, n) is found by forming the distribution p(y, $\alpha$|x, n) and marginalizing over $\alpha$. Note $p(\alpha|x,n)=p(\alpha)$ is assumed, which is reasonable.

$$p(y|x,n) = \int_{-\infty}^{\infty} p(y|x,n,\alpha)p_\alpha(\alpha)d\alpha$$

$$= \int_{-\infty}^{\infty} \delta\left(y - \ln\left(e^x + e^n + 2\alpha e^{\frac{x+n}{2}}\right)\right)p_\alpha(\alpha)d\alpha$$

The identity $$\int_{-\infty}^{\infty} \delta(f(\alpha))p_\alpha(\alpha)d\alpha = \sum_{\{\alpha:f(\alpha)=0\}} \frac{p_\alpha(\alpha)}{\left|\frac{d}{d\alpha}f(\alpha)\right|}$$

can then be used to evaluate the integral in closed form:

$$p(y|x,n) = \frac{e^x + e^n + 2\alpha e^{\frac{x+n}{2}}}{2e^{\frac{x+n}{2}}} p_\alpha(\alpha)\bigg|_{\alpha=\frac{e^y - e^x - e^n}{2e^{\frac{x+n}{2}}}} \qquad \text{EQ. 7}$$

$$= \frac{1}{2}\exp\left(y - \frac{x+n}{2}\right)p_\alpha\left(\frac{e^y - e^x - e^n}{2e^{\frac{x+n}{2}}}\right)$$

When the Gaussian approximation for $p_\alpha(\alpha)$ is introduced, the likelihood function becomes EQ. 7A $$\ln p(y|x,n) = y - \frac{x+n}{2} - \frac{1}{2}\ln 8\pi\sigma_\alpha^2 - \frac{(e^y - e^x - e^n)^2}{8\sigma_\alpha^2 e^{(x+n)}}.$$

Shift Invariance

The conditional probability (Eq. 7) appears at first glance to have three independent variables. Instead, it is only a function of two: the relative value of speech and observation (x–y), and the relative value of noise and observation (n–y).

Instead of working with absolute values of y, x, and n, Eq. 7 can be rearranged as $$p(y|x,n) = \frac{1}{2}\exp\left(-\frac{\bar{x}+\bar{n}}{2}\right)p_\alpha\left(\frac{1 - e^{\bar{x}} - e^{\bar{n}}}{2e^{\frac{\bar{x}+\bar{n}}{2}}}\right)$$

where $$\bar{x}=x-y, \bar{n}=n-y$$

By working with the normalized values, three independent variables have been reduced to two.

Model Behavior

FIG. 3A contains a plot of this conditional probability distribution. FIG. 3B shows an equivalent plot, directly estimated from data, thereby confirming Eq. 7A.

Faith in the model can be built through either examining its ability to explain existing data, or by examining its asymptotic behavior.

FIG. 3A contains a plot of the conditional probability distribution of the model represented by Eq. 7A. Note that due to the shift invariance of this model, there are only two independent terms in the plot.

Compare this to FIG. 3B, which is a histogram of x−y versus n−y for a single frequency bin across all utterances in set A, subway noise, 10 dB SNR. It is clear that the model is an accurate description of the data. It should be noted some previous models, have an error model that is independent of SNR. The new model automatically adjusts its variance for different SNR hypotheses.

As we move left along n=y in the graph of FIG. 3A, the variance perpendicular to this line decreases. This corresponds to more and more certainty about the noise value as the ratio of speech to observation decreases. In the limit of this low SNR hypothesis, the model is reducing it's uncertainty that n=y to zero. If the prior probability distributions for speech and noise are concentrated in this area, the model reduces to $$p(y|x)=p_n(y).$$

Symmetrically, as we move down along x=y in the same graph, the variance perpendicular to this line decreases. As the ratio of noise to observation decreases, the model has increasing certainty that x=y. We refer to this region as the high SNR hypothesis. If the priors for speech and noise are concentrated in this area, the model reduces to $$p(y|x)=\delta(y-x).$$

The graph also has a third region of interest, starting from the origin and moving in a positive x and n direction. In this region, both speech and noise are greater than the observation. This occurs most frequently when x and n have similar magnitudes, and are destructively interfering with each other. In this case the relevant θ exist in the region $$|\theta| > \frac{\pi}{2}.$$

Relationship to Spectral Subtraction

Eq. 7A can be used to derive a new formula for spectral subtraction. The first step is to hold n and y fixed, and find a maximum likelihood estimate for x. Taking the derivative with respect to x in Eq. 7A and equating it to zero results in EQ. 8

$$e^{x-n}=\sqrt{(e^{y-n}-1)^2+(2\sigma_\alpha^2)^2}-2\sigma_\alpha^2.$$

This formula is already more well-behaved than standard spectral subtraction. The first term is always real because the square root is taken of the sum of two positive numbers. Furthermore, the magnitude of the second term is never larger than the magnitude of the first term, so both sides of Eq. 8 are non-negative. The entire formula has exactly one zero, at n=y. This automatically prevents taking the logarithm of any negative numbers during spectral subtraction, allowing the maximum attenuation floor F to be relaxed.

When $\sigma_\alpha^2=0$ and Eq. 8 is solved for x, the result is a new spectral subtraction equation with an unexpected absolute value operation. EQ. 9

$$\hat{x}=y+\ln|1-e^{n-y}|$$

Figure 4A:
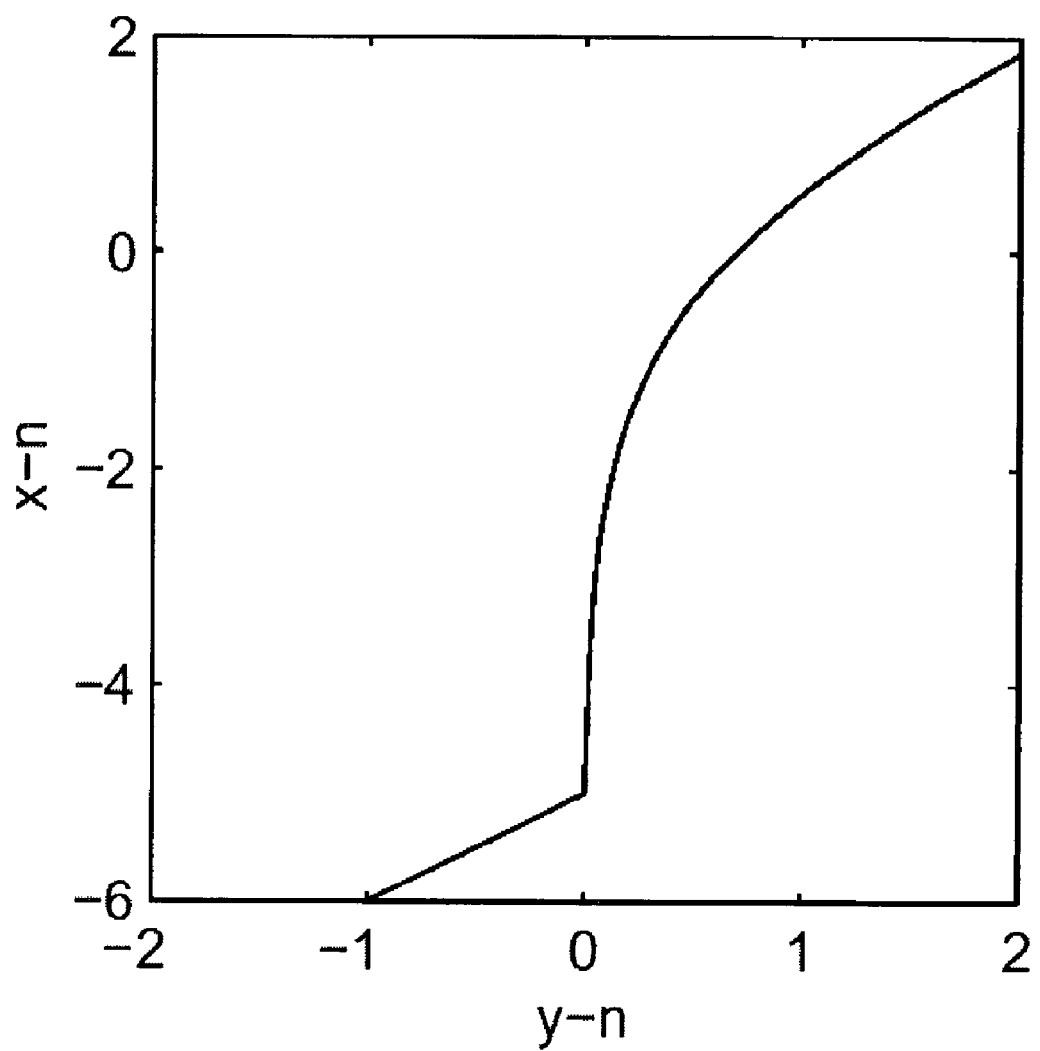
FIG. 4A is a plot of output SNR to input SNR for known spectral subtraction.
Figure 4B:
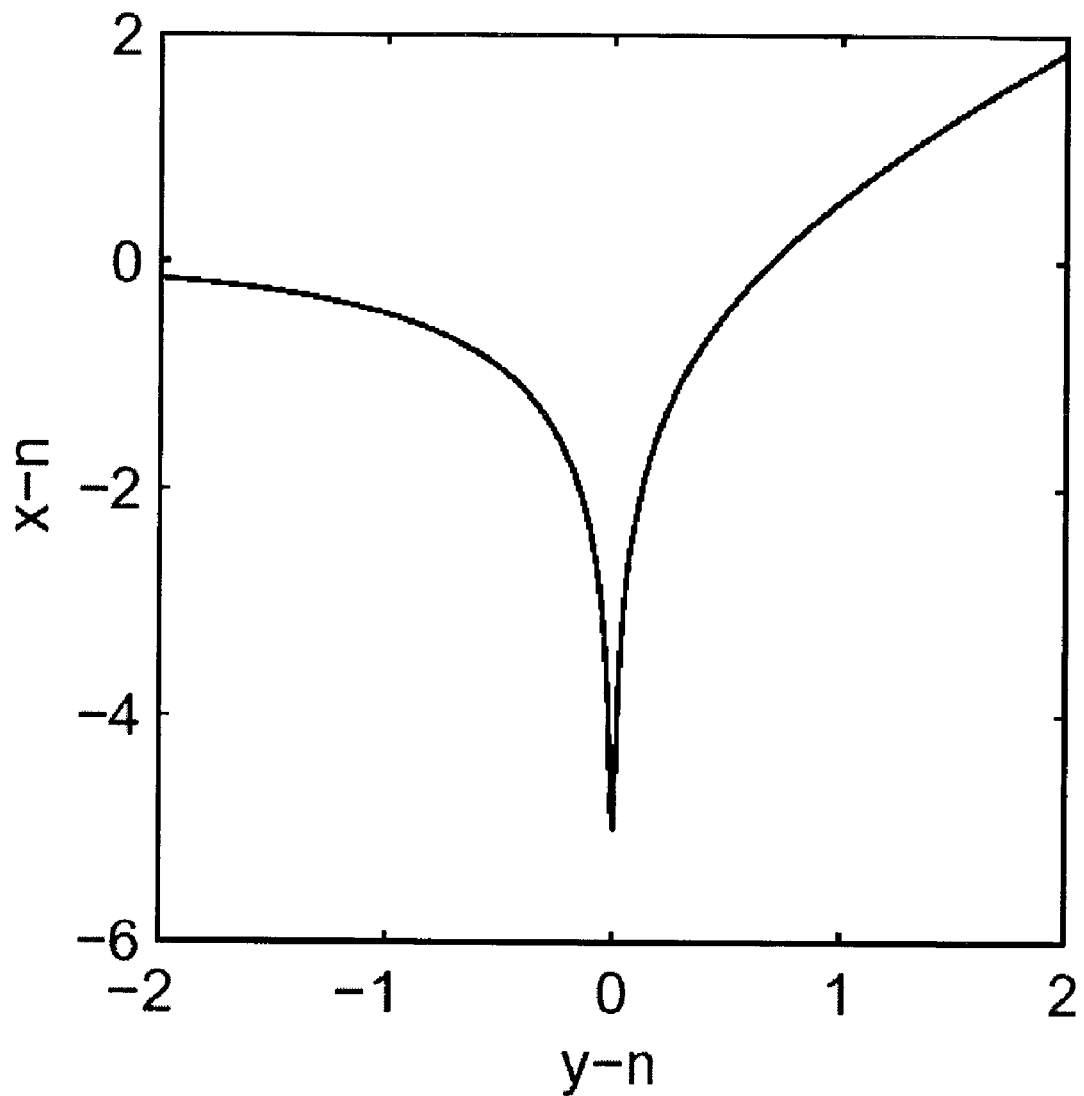
FIG. 4B is a plot of output SNR to input SNR for a new spectral subtraction method of the present invention.

The difference between Eq. 1 and Eq. 9 is confined to the region y<n, as illustrated in FIGS. 4A and 4B.

Spectral subtraction assumes any observation below y=n is equivalent to a signal to noise ratio of the floor F, and produces maximum attenuation.

The data illustrated in FIG. 3B contradicts this assumption, showing a non-zero probability mass in the region n>y.

The end result is that, even with perfect knowledge of the true noise, spectral subtraction treats these points inappropriately.

Eq. 9 has more reasonable behavior in this region. As the observation becomes much lower than the noise estimate, the function approaches x=n. The new model indicates the most likely state is that x and n have similar magnitudes and are experiencing destructive phase interference.

Table II compares the relative accuracy of using Equations 1 and 9 for speech recognition, when the true noise spectra are available. Although the new method does not require a floor to prevent taking the logarithm of a negative number, it is included because it does yield a small improvement in error rate.

TABLE II

| Method | FLOOR | | | | |
|---|---|---|---|---|---|
| | $e^{-20}$ | $e^{-10}$ | $e^{-5}$ | $e^{-3}$ | $e^{-2}$ |
| Standard (Eq. 1) | 87.50 | 56.00 | 34.54 | 11.31 | 15.56 |
| Proposed (Eq. 9) | 6.43 | 5.74 | 4.10 | 7.82 | 10.00 |

Regardless of the value chosen for the floor, the new method outperforms the old spectral subtraction rule. Although the old method is quite sensitive to the value chosen, the new method is not, producing less than 10% digit error rate for all tests.

In one embodiment, noisy-speech frames are processed independently of each other. A sequential tracker for estimating the log spectrum of non-stationary noise can be used to provide a noise estimate on a frame-by-frame basis. A suitable noise estimator is described in METHOD OF ITERATIVE NOISE ESTIMATION IN A RECURSIVE FRAMEWORK Ser. No. 10/237,162, filed on even date herewith.

IV. A Bayesian Approach

Another advantage of deriving the conditional observation probability, Eq. 7A, is that it can be embedded into a unified Bayesian model. In this model, the observed variable y is related to the hidden variables, including x and n through a unified probabilistic model.

$$p(y, x, n)=p(y|x, n)p_x(x)p_n(n)$$

From this model, one can infer posterior distributions on the hidden variables x and n, including MMSE (minimum mean square error) and maximum likelihood estimates. In this way, noisy observations are turned into probability distributions over the hidden clean speech signal.

To produce noise-removed features for conventional decoding, conditional expectations of this model are taken.

$$E[x|y] = \int_{-\infty}^{\infty} xp(x|y)dx, \text{ where} \quad \text{EQ. 10}$$

$$p(x|y) = \frac{\int_{-\infty}^{\infty} p(y, x, n)dn}{\int_{-\infty}^{\infty}\int_{-\infty}^{\infty} p(y, x, n)dxdn} \quad \text{EQ. 11}$$

The Bayesian approach can additionally produce a variance of its estimate of E[x|y]. This variance can be easily leveraged within the decoder to improve word accuracy. A suitable decoding technique is described in METHOD OF PATTERN RECOGNITION USING NOISE REDUCTION UNCERTAINTY, filed May 20, 2002 and assigned Ser. No. 10/152,127. In this form of uncertainty decoding, the static feature stream is replaced with an estimate of p(y|x). The noise removal process outputs high variance for low SNR features, and low variance when the SNR is high. To support this framework, the following are also provided:

$$E[x^2 | y] = \int_{-\infty}^{\infty} x^2 p(x | y) dx, \text{ and} \qquad \text{EQ. 12}$$

$$p(y) = \int_{-\infty}^{\infty} \int_{-\infty}^{\infty} p(y, x, n) dx dn. \qquad \text{EQ. 13}$$

Better results are achieved with a stronger prior distribution for clean speech, such as a mixture model.

$$p_x(x) = \sum_m p_x(x | m) p_m(m).$$

When a mixture model is used, Equations 10, 11, 12, and 13 are conditioned on the mixture m, evaluated, and then combined in the standard way:

$$p(y) = \sum_m p(y | m) p(m) \qquad E[x | y] = \sum_m E[x | y, m] p(m | y)$$

$$p(m | y) = \frac{p(y | m) p(m)}{p(y)} \qquad E[x^2 | y] = \sum_m E[x^2 | y, m] p(m | y)$$

Approximating the Observation Likelihood

As mentioned previously, the form derived for p(y|x, n) does not lend itself to direct algebraic manipulation. Furthermore, it is capable of producing joint distributions that are not well modeled by a Gaussian approximation. As a result, some steps are performed to compute the necessary integrations for noise removal.

When computation is less of an issue, a much finer non-iterative approximation of p(y|x, n) can be used. The approximation preserves the global shape of the conditional observation probability so that the usefulness of the model is not masked by the approximation.

One perfectly reasonable, although computationally intensive, option is to make no approximation of Eq. 7A. The joint probability p(y, x, n) can be evaluated along a grid of points in x and n for each observation y. Weighted sums of these values could produce accurate approximations to all of the necessary moments. Selecting an appropriate region is a non-trivial task, because the region is dependent on the current observation and the noise and speech priors. More specifically, to avoid unnecessary computation, the evaluation should be limited to the region where the joint probability has the most mass. Essentially, a circular paradox is realized where it is necessary to solve the problem before choosing appropriate parameters for a solution.

Another reasonable approach is to approximate the joint probability with a single Gaussian. This is the central idea in vector Taylor series (VTS) approximation. Because the prior distributions on x and n limit the scope of p(y|x, n), this local approximation may be more appropriate than a global approximation. However, there are two potential pitfalls associated with this method. First, even though the prior distributions are unimodal, applying p(y|x, n) can introduce more modes to the joint probability. Second, the quadratic expansions along x and n do not capture the shape of p(y|x, n) well when n<<y or x<<y.

Instead, one aspect of the present inventions is a compromise between these two methods. In particular, a Gaussian approximation is used to avoid summation over a two-dimensional grid, while at the same time preserving the true shape of p(y|x, n). This is accomplished by collapsing one dimension with a Gaussian approximation, and implementing a brute force summation along the remaining dimension.

Normal Approximation to Likelihood

In this aspect of the present invention, a Gaussian approximation is used along one dimension only, which allows preservation of the true shape of p(y|x, n), and allows a numerical integration along the remaining dimension.

Figure 5:
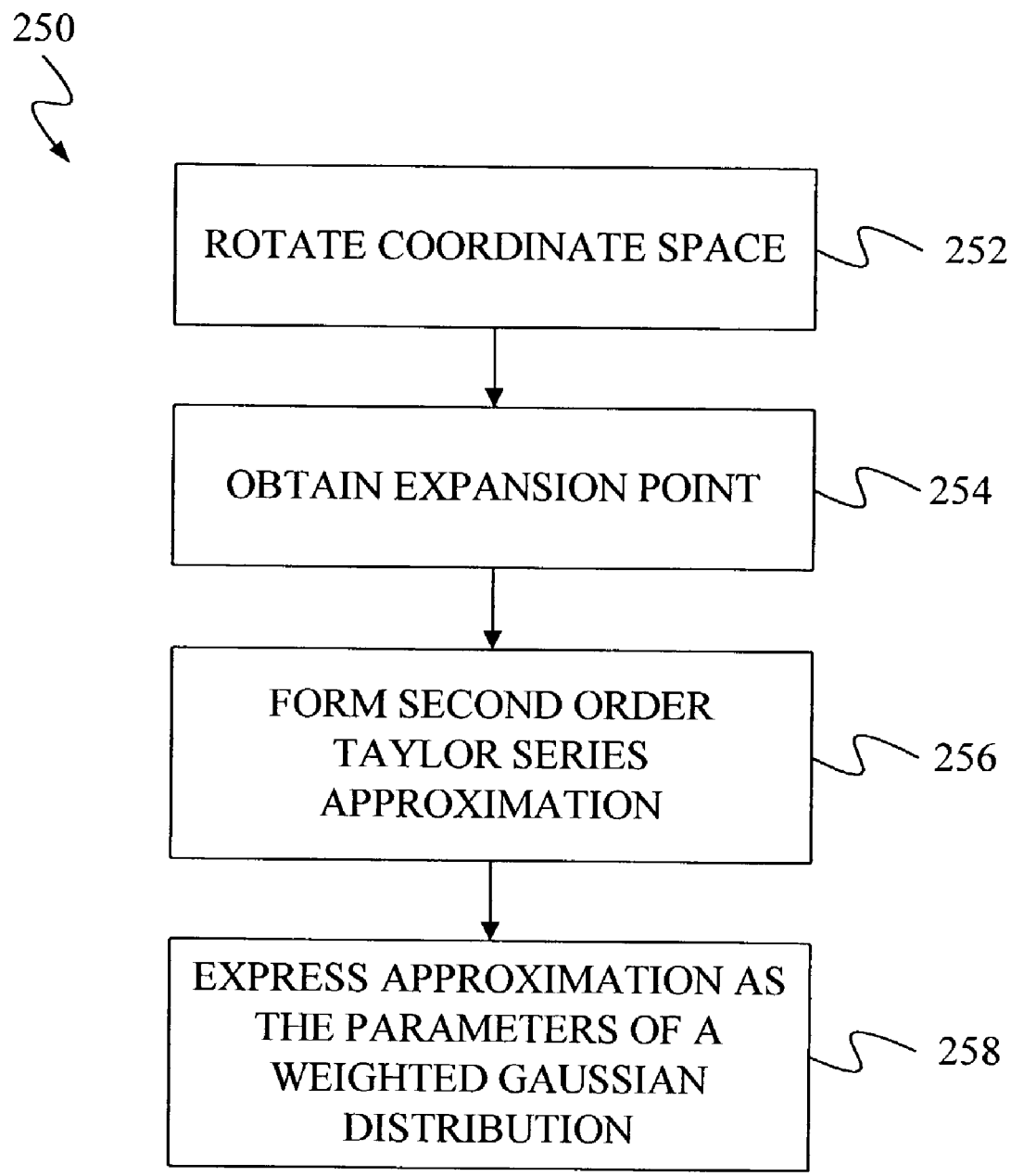
FIG. 5 is a method illustrating steps for obtaining a weighted Gaussian approximation in the model of the present invention.

The weighted Gaussian approximation is found in four steps illustrated in FIG. 5 at 250. The coordinate space is first rotated in step 252. An expansion point is chosen in step 254. A second order Taylor series approximation is then made in step 256. The approximation is then expressed as the parameters of a weighted Gaussian distribution in step 258.

The coordinate rotation is necessary because expanding along x or n directly can be problematic. A 45 degree rotation is used, which makes p(y|x,n) approximately Gaussian along u for each value of v.

$$u(y, x, n) = \frac{1}{\sqrt{2}} (x + n - 2y), \quad v(y, x, n) = \frac{1}{\sqrt{2}} (x - n)$$

Although the new coordinates u and v are linear functions of y, x and n, the cumbersome functional notation at this point can be dropped.

After this change of variables, the conditional observation likelihood becomes, $$\ln p(y | x, n) = -\frac{1}{\sqrt{2}} u - \frac{1}{2} \ln 8\pi\sigma_\alpha^2 - \frac{\left(1 - e^{\frac{u}{\sqrt{2}}} \left(e^{\frac{v}{\sqrt{2}}} - e^{-\frac{v}{\sqrt{2}}}\right)\right)^2}{8\sigma_\alpha^2 \exp(\sqrt{2} u)}.$$

Next, v is held constant and a weighted Taylor series approximation along u is determined. For each v, the Taylor series expansion point is found by performing the change of variables on Eq. 3, holding v constant, α=0, and solving for u. The $$u_v = v - \sqrt{2} \ln(1 + \exp\sqrt{2} v).$$

result is,

The coefficients of the expansion are the derivatives of p(y|x,n) evaluated at $u_v$.

$$p(y | x, n)|_{u=u_v} = \frac{\ln(1 + \cosh\sqrt{2} v) - \ln 4\pi\sigma_\alpha^2}{2}$$

$$\frac{d}{du} \ln p(y | x, n)\Big|_{u=u_v} = -\frac{1}{2}\sqrt{2}$$

-continued $$\frac{d^2}{du^2}\ln p(y\mid x,n)\bigg|_{u=u_v} = -\frac{1+\cosh\sqrt{2}\,v}{4\sigma_\alpha^2}$$

The quadratic approximation of p(y|x,n) at each value of v can then be expressed as a Gaussian distribution along u. Our final approximation is given by:

$$p(y\mid x,n) = e^{K_v} N(u;\mu_v,\sigma_v^2), \text{ where} \qquad \text{EQ. 15}$$

$$\sigma_v^2 = \frac{4\sigma_\alpha^2}{1+\cosh\sqrt{2}\,v},$$

$$\mu_v = u_v - \frac{1}{\sqrt{2}}\sigma_v^2, \text{ and}$$

$$K_v = \frac{1}{2}\ln 2 + \frac{\sigma_\alpha^2}{1+\cosh\sqrt{2}\,v}.$$

As FIG. 3C illustrates, this final approximation is quite good at capturing the shape of p(y|x,n). And, as discussed below, the Gaussian approximation along u can be leveraged to eliminate a significant amount of computation. Building the joint probability The approximation for p(y|x,n) is complete, and is now combined with the priors $p_x(x)$ and $p_n(n)$ to produce the joint probability distribution. To conform to the approximation of the conditional observation probability, these prior distributions to the (u, v) coordinate space are transformed, and written as a Gaussian in u whose mean and variance are functions of v. EQ. 16

$$p_{x,n}(x,n) = p_x(x)p_n(n) = N(u;\eta_v,\gamma_v^2).$$

Integration

From the joint probability, Equations 10, 11, 12, and 13 are computed. Each equation requires at least one double integral over x and n, which is equivalent to a double integral over u and v. For example:

$$\int_{-\infty}^{\infty}\int_{-\infty}^{\infty} x p(y,x,n)\,dx\,dn \qquad \text{EQ. 17}$$

$$\int_{-\infty}^{\infty}\int_{-\infty}^{\infty}\left(\frac{u+v}{\sqrt{2}}+y\right)N(u;\mu_v,\sigma_v^2)N(u;\eta_v,\gamma_v^2)\,du\,dv$$

$$\int_{-\infty}^{\infty} e^{K_v}\left(\frac{\hat{\mu}_v+v}{\sqrt{2}}+y\right)N(\mu_v;\eta_v,\sigma_v^2+\gamma_v^2)\,dv,$$

where $\hat{\mu}_v = \dfrac{\sigma_v^2 \eta_v + \gamma_v^2 \mu_v}{\sigma_v^2 + \gamma_v^2}.$ Here, the method makes use of Eq. 14 for x, as well as Eq. 15 and Eq. 16 for p(y,x,n). The Gaussian approximation enables a symbolic evaluation of the integral over u, but the integral over v remains.

The integration in v is currently implemented as a numerical integration, a weighed sum along discrete values of v. In one embodiment, 500 equally spaced points in the range [−20, 20] are used. Most of the necessary values can be pre-computed and tabulated to speed up computation.

MMSE Estimator Based on Taylor Series Expansion

The foregoing has described a new spectral subtraction formula (Eq. 9) and a numerical integration, after rotation of axis, to compute the MMSE estimate for speech removal. The following provides a further technique, in particular, an iterative Taylor series expansion to compute the MMSE (minimum mean square error) estimate in an analytical form in order to remove noise using the phase-sensitive model of the acoustic environment described above.

Given the log-domain noisy speech observation y, the MMSE estimator $\hat{\chi}$ for clean speech $\chi$ is the conditional expectation:

$$\hat{x} = E[x\mid y] = \int x p(x\mid y)\,dx = \frac{\int x p_{\bar{n}}(y\mid x)p(x)\,dx}{p(y)}, \qquad \text{EQ. 18}$$

where $p_{\bar{n}}(y|x) = p(y|x,\bar{n})$ is determined by the probabilistic environment model just presented. The prior model for clean speech, p(x) in Eq. 18 is assumed to have the Gaussian mixture PDF:

$$p(x) = \sum_{m=1}^{M} c_m \underbrace{N(x;\mu_m,\sigma_m^2)}_{p(x\mid m)}, \qquad \text{EQ. 19}$$

whose parameters are pre-trained from the log-domain clean speech data. This allows Eq. 18 to be written as $$\hat{x} = \frac{\sum_{m=1}^{M} c_m \int x \underbrace{p(x\mid m)p(y\mid x,\bar{n})}_{J_m(x)}dx}{p(y)}, \qquad \text{EQ. 20}$$

The main difficulty in computing $\hat{\chi}$ above is the non-Gaussian nature of p(y|x, $\bar{n}$). To overcome this difficulty, a truncated second-order Taylor series expansion is used to approximate the exponent of $$J_m(x) = N(x;\mu_m,\sigma_m^2) \times \frac{N(\alpha(x,\bar{n},y);0,\sigma_\alpha^2)}{2 e^{\frac{\bar{n}+x}{2}-y}} \qquad \text{EQ. 21}$$

$$= \frac{C}{\sigma_m} e^{-0.5(x-\mu_m)^2/\sigma_m^2 - 0.5x - 0.5\alpha^2(x)/\sigma_\alpha^2}.$$

That is, the following function is approximated $$b_m(x) = -0.5(x-\mu m)^2/\sigma_m^2 - 0.5x - 0.5\alpha^2(x)/\sigma_\alpha^2$$

By $$b_m(x) \approx b_m^{(0)}(x_0) + b_m^{(1)}(x_0)(x-x_0) + \frac{b_m^{(2)}(x_0)}{2}(x-x_0)^2. \qquad \text{EQ. 22}$$

In Eq. 22, a single-point expansion point $\chi_0$ is used (i.e., $x_0$ does not depend on the mixture component m) to provide significantly improved computational efficiency, and $\chi_0$ is iteratively updated to increase its accuracy to the true value of clean speech x. The Taylor series expansion coefficients have the following closed forms:

$$b_m^{(0)}(x_0) = b_m(x)|_{x=x_0}$$

$$= -\frac{(x_0-\mu_m)^2}{2\sigma_m^2} - \frac{x_0}{2} - \frac{(e^y - e^{\bar{n}} - e^{x_0})^2}{8\sigma_\alpha^2 e^{\bar{n}+x_0}},$$

$$b_m^{(1)}(x_0) = \frac{\partial b_m(x)}{\partial x}\bigg|_{x=x_0} = -\frac{x_0 - \mu_m}{\sigma_m^2} - \frac{1}{2} +$$

$$\frac{e^{2y-\bar{n}-x_0} - 2e^{y-x_0} + e^{\bar{n}-x_0} - e^{x_0-\bar{n}}}{8\sigma_\alpha^2},$$

$$b_m^{(2)}(x_0) = \frac{\partial^2 b_m(x)}{\partial^2 x}\bigg|_{x=x_0} = -\frac{1}{\sigma_m^2} +$$

$$\frac{-e^{2y-\bar{n}-x_0} + 2e^{y-x_0} - e^{\bar{n}-x_0} - e^{x_0-\bar{n}}}{8\sigma_\alpha^2}.$$

It should be noted $\Sigma_\alpha = \sigma^{\alpha 2}$. In other words, a zero-mean Gaussian distribution is used for the phase factor α in the new model described above, and which is used in this embodiment.

Fitting Eq. 22 into a standard quadratic form, the following is obtained $$b_m(x) \approx \frac{b_m^{(2)}(x_0)}{2}\left[x - \left(x_0 - \frac{b_m^{(1)}(x_0)}{b_m^{(2)}(x_0)}\right)\right]^2 + w_m(x_0),$$

where $$w_m(x_0) = b_m^{(0)}(x_0) + \frac{b_m^{(2)}(x_0)}{2}\left[x_0^2 - \frac{2b_m^{(1)}}{b_m^{(2)}}x_0 - \left(x_0 - \frac{b_m^{(1)}}{b_m^{(2)}}\right)^2\right].$$

This then allows computing the integral of Eq. 20 in a closed form:

$$I_m(x_0) = \int xJ_m dx = \frac{C}{\sigma_m}\int x e^{b_m(x)} dx \qquad \text{EQ. 23}$$

$$\approx \frac{C'}{\sigma_m\sqrt{b_m^{(2)}}} e^{w_m(x_0)} \times \left(x_0 - \frac{b_m^{(1)}(x_0)}{b_m^{(2)}(x_0)}\right).$$

The denominator of Eq. 20 is computed according to $$p(y) = \sum_{m=1}^{M} c_m \int J_m(x) dx = \sum_{m=1}^{M} c_m \frac{C}{\sigma_m}\int e^{b_m(x)} dx \qquad \text{EQ. 24}$$

$$\approx \sum_{m=1}^{M} c_m \frac{C'}{\sigma_m\sqrt{b_m^{(2)}}} e^{w_m(x_0)}.$$

Substituting Eqs. 23 and 24 into Eq. 20, the final MMSE estimator is obtained:

$$\hat{x} \approx \sum_{m=1}^{M} \gamma_m(x_0, \bar{n})\left(x_0 - \frac{b_m^{(1)}(x_0)}{b_m^{(2)}(x_0)}\right), \qquad \text{EQ. 25}$$

Where the weighting factors are $$\gamma_m(x_0, \bar{n}) = \frac{\frac{c_m}{\sigma_m\sqrt{b_m^{(2)}}} e^{w_m(x_0)}}{\sum_{m=1}^{M} \frac{c_m}{\sigma_m\sqrt{b_m^{(2)}}} e^{w_m(x_0)}}.$$

Note that $\gamma_m$, $b_m^{(1)}(\chi_0)$, and $b_m^{(2)}(\chi_0)$ in Eq. 24 are all dependent on the noise estimator $\bar{n}$, which can be obtained from any suitable noise tracking estimator such as described in the co-pending application referenced above.

Figure 6:
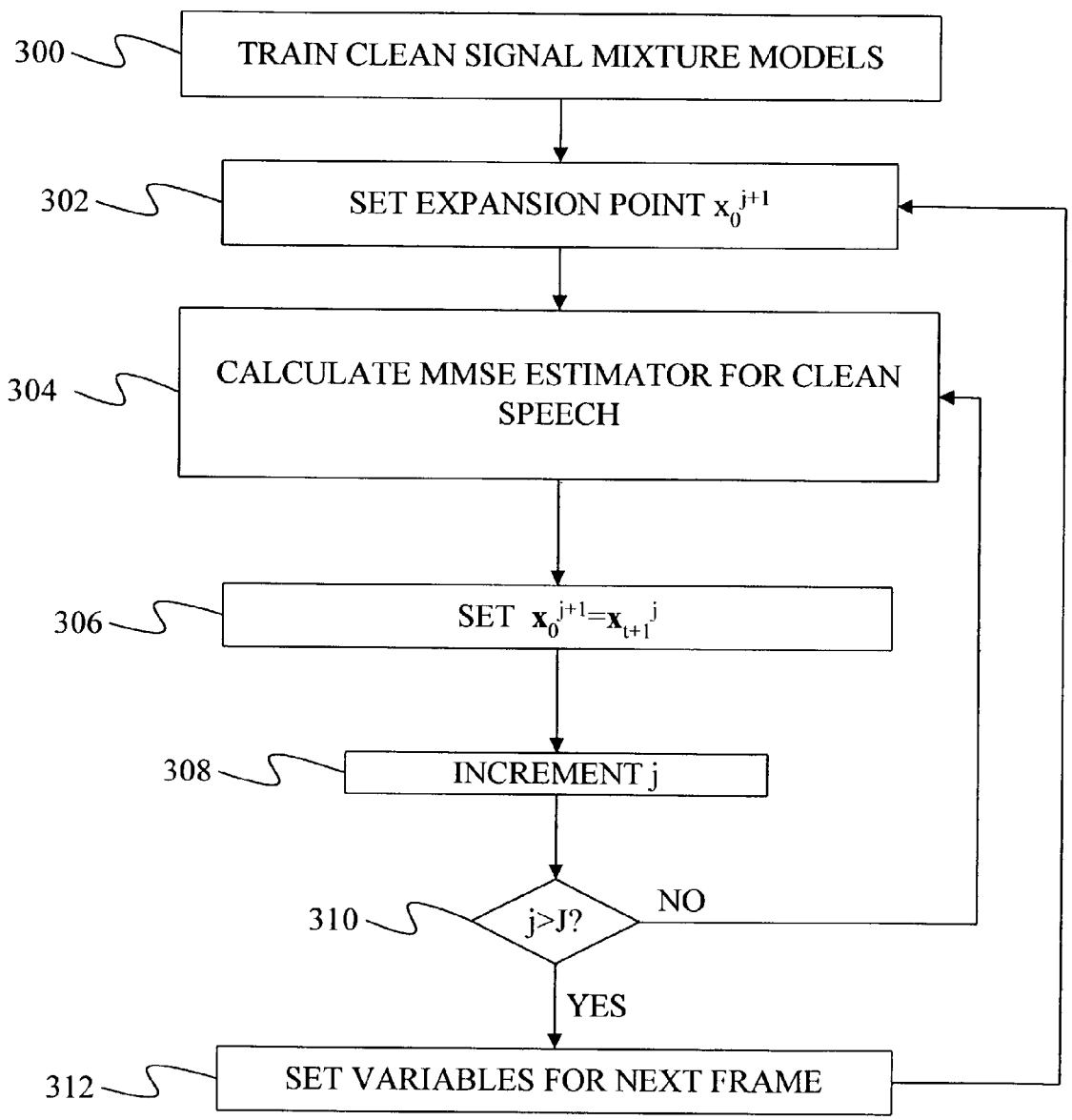
FIG. 6 is a flow diagram of another method of estimating clean speech.

Under this aspect of the present invention, the clean speech estimate of the current frame, $x_{t+1}$, is calculated several times using an iterative method shown in the flow diagram of FIG. 6.

The method of FIG. 6 begins at step 300 where the distribution parameters for the prior clean speech mixture model are pretrained from a set of clean training data. In particular, the mean, $\mu_m$, covariance, $\sigma_m$, and mixture weight, $c_m$, for each mixture component m in a set of M mixture components is determined.

At step 302, the expansion point, $x_0^j$, used in the Taylor series approximation for the current iteration, j, can be set equal to the mean vector of the Gaussian mixture model of the clean speech that best accounts for (in the maximum likelihood sense) the noisy speech observation vector y given the estimated noise vector n.

At step 304, the MMSE estimator for clean speech is calculated according to Eq. 25.

At step 306, the Taylor series expansion point for the next iteration, $x_0^{j+1}$, is set equal to the noise estimate found for the current iteration, $x_{t+1}^j$. In terms of an equation:

$$x_0^{j+1} = x_{t+1}^j \qquad \text{EQ. 26}$$

The updating step shown in Eq. 26 improves the estimate provided by the Taylor series expansion and thus improves the calculation during the next iteration.

At step 308, the iteration counter j is incremented before being compared to a set number of iterations J at step 310. If the iteration counter is less than the set number of iterations, more iterations are to be performed and the process returns to step 304 to repeat steps 304, 306, 308 and 310 using the newly updated expansion point.

After J iterations have been performed at step 310, the final value for the clean speech estimate of the current frame has been determined and at step 312, the variables for the next frame are set. In one embodiment, J is set equal to three. Specifically, the iteration counter j is set to zero, the frame value t is incremented by one, and the expansion point $\chi_0$ for the first iteration of the next frame is set.

Figure 7:
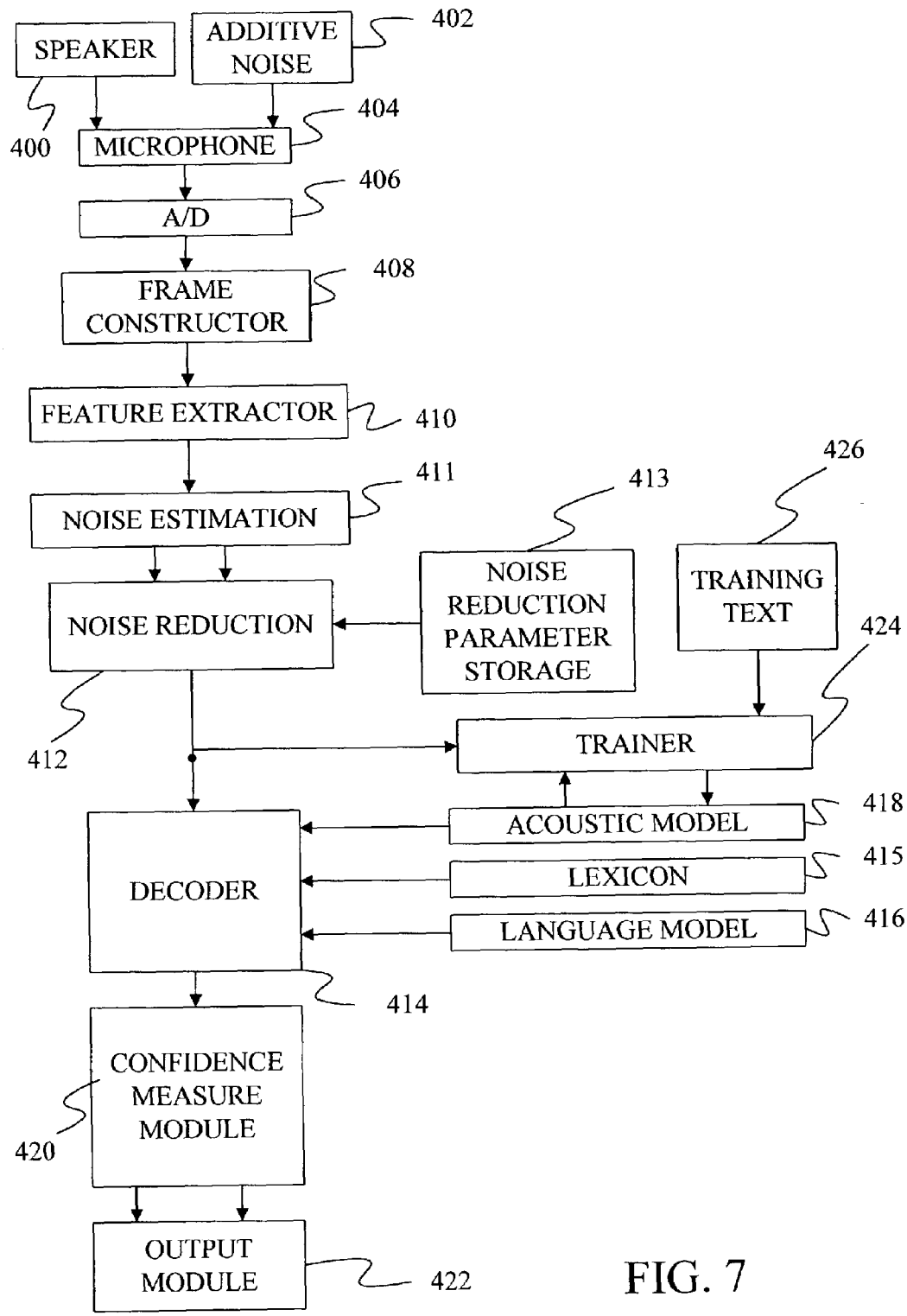
FIG. 7 is a block diagram of a pattern recognition system in which the present invention may be used.

A method and system for using the present invention in speech recognition is shown the block diagram of FIG. 7. The method begins where a noisy speech signal is converted into a sequence of feature vectors. To do this, a microphone 404 of FIG. 7, converts audio waves from a speaker 400 and one or more additive noise sources 402 into electrical signals. The electrical signals are then sampled by an analog-to-digital converter 406 to generate a sequence of digital values, which are grouped into frames of values by a frame constructor module 408. In one embodiment, A-to-D converter 406 samples the analog signal at 16 kHz and 16 bits per sample, thereby creating 32 kilobytes of speech data per second and frame constructor module 408 creates a new frame every 10 milliseconds that includes 25 milliseconds worth of data.

Each frame of data provided by frame constructor module 408 is converted into a feature vector by a feature extractor 410. Methods for identifying such feature vectors are well known in the art and include 13-dimensional Mel-Frequency Cepstrum Coefficients (MFCC) extraction.

The feature vectors for the noisy speech signal are provided to a noise estimation module 411 in FIG. 7. Noise estimation module 411 estimates the noise in the current frame and provides a feature vector representing the noise estimate, or a distribution thereof, together with the noisy speech signal to a noise reduction module 412.

The noise reduction module 412 uses any one of the techniques described above, (new spectral subtraction of Eq. 9, the Bayesian approach with weighted Gaussian Approximation, or an MMSE estimator) with model parameters of the corresponding implementing equations, which are stored in noise reduction parameter storage 411, to produce a sequence of noise-reduced feature vectors from the sequence of noisy feature vectors, or distributions thereof.

The output of noise reduction module 412 is a series of noise-reduced feature vectors. If the input signal is a training signal, this series of noise-reduced feature vectors is provided to a trainer 424, which uses the noise-reduced feature vectors and a training text 426 to train an acoustic model 418. Techniques for training such models are known in the art and a description of them is not required for an understanding of the present invention.

If the input signal is a test signal, the noise-reduced feature vectors are provided to a decoder 414, which identifies a most likely sequence of words based on the stream of feature vectors, a lexicon 415, a language model 416, and the acoustic model 418. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary acoustic model(not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Although FIG. 7 depicts a speech recognition system, the present invention may be used in other noise removal applications such as removing noise of recordings, or prior to transmission of data in order to transmit cleaner data. In this manner, the pattern recognition system is also not limited to speech.

Although the present invention has been described with reference to particular embodiments, workers skilled in the art will recognize that changes may be made in form and detail without departing from the spirit and scope of the invention.

What is claimed is:

1. A method for reducing noise in a noisy input signal, the method comprising:
converting a frame of the noisy input signal into an input feature vector; and
obtaining a noise-reduced feature vector by using an equation of the form $$\hat{x} = y + \ln|1 - e^{n-y}|$$

where y is the input feature vector and n comprises a noise estimate.

2. A computer-readable medium having computer-executable instructions comprising:
converting a frame of the noisy input signal into an input feature vector; and
obtaining a noise-reduced feature vector by using an equation of the form $$\hat{x} = y + \ln|1 - e^{n-y}|$$

where y is the input feature vector and n comprises a noise estimate.

3. A computer-readable medium having computer-executable instructions comprising:
a first module converting a frame of a noisy input signal into an input feature vector; and
a second module obtaining an estimate of a noise-reduced feature vector using an acoustic model of the acoustic environment, the acoustic model being based on a non-linear function that describes a relationship between the input feature vector, a clean feature vector, a noise feature vector and a phase relationship indicative of mixing of the clean feature vector and the noise feature vector, the phase relationship including a phase factor with a statistical distribution comprising a zero-mean Gaussian distribution, and wherein the acoustic model is based on a rotation of a coordinate space comprising the input feature vector, the clean feature vector and the noise feature vector to a change of variables having two dimensions.

4. The computer-readable medium of claim 3 wherein one dimension of the acoustic model is approximately Gaussian.

5. The computer-readable medium of claim 4 wherein the second module includes instructions to obtain the estimate of the noise-reduced feature vector as a function of performing a symbolic integration over one dimension of the acoustic model.

6. The computer-readable medium of wherein claim 4 the second module includes instructions to obtain the estimate of the noise-reduced feature vector as a function of performing a numeric integration over a second dimension of the acoustic model.

7. The computer-readable medium of claim 3 wherein the second module includes instructions for obtaining an estimate of the noise-reduced feature vector as a function of a Taylor series approximation.

8. The computer-readable medium of claim 7 wherein the second module includes instructions for obtaining an estimate of the noise-reduced feature vector as a function of a prior estimate of the noise-reduced feature vector.

9. The computer-readable medium of claim 8 wherein the second module includes instructions for obtaining an estimate of the noise-reduced feature vector as a function of repeatedly using an immediate prior estimate of the noise-reduced feature vector in a subsequent calculation for a selected number of iterations.

10. A method for reducing noise in a noisy input signal, the method comprising:
converting a frame of the noisy input signal into an input feature vector;
obtaining an acoustic model of the acoustic environment, the acoustic model being based on a non-linear function that describes a relationship between the input feature vector, a clean feature vector, a noise feature vector and a phase relationship indicative of mixing of the clean feature vector and the noise feature vector, the phase relationship being in the same domain as the clean feature vector and the noise feature vector, wherein obtaining the acoustic model includes modeling the phase relationship with a phase factor having a statistical distribution comprising a zero-mean Gaussian distribution, and wherein obtaining the acoustic model includes rotating a coordinate space of the acoustic model comprising the input feature vector, the clean feature vector and the noise feature vector to obtain a change of variables having two dimensions; and using the input feature vector, the noise feature vector and the acoustic model to estimate the noise-reduced feature vector.

11. The method of claim 10 wherein one dimension of the acoustic model is approximately Gaussian.

12. The method of claim 11 wherein using the input feature vector, the noise feature vector and the acoustic model to estimate the noise-reduced feature vector includes integrating symbolically over one dimension of the acoustic model.

13. The method of claim 12 wherein using the input feature vector, the noise feature vector and the acoustic model to estimate the noise-reduced feature vector includes integrating numerically over a second dimension of the acoustic model.

14. The method of claim 12 wherein using the input feature vector, the noise feature vector and the acoustic model to estimate the noise-reduced feature vector includes using a Taylor series approximation.

15. The method of claim 14 wherein using the input feature vector, the noise feature vector and the acoustic model to estimate the noise-reduced feature vector includes using a prior estimate of the noise-reduced feature vector.

16. The method of claim 13 wherein using the input feature vector, the noise feature vector and the acoustic model to estimate the noise-reduced feature vector includes repeatedly using an immediate prior estimate of the noise-reduced feature vector in a subsequent calculation for a selected number of iterations.

* * * * *

UNITED STATES PATENT AND TRADEMARK OFFICE
CERTIFICATE OF CORRECTION

PATENT NO. : 7,047,047 B2
APPLICATION NO. : 10/237163
DATED : May 16, 2006
INVENTOR(S) : Alejandro Acero et al.

Page 1 of 2

It is certified that error appears in the above-identified patent and that said Letters Patent is hereby corrected as shown below:

On page 2, item (56), under "Other Publications", in column 1, line 12, delete "evalutations" and insert -- evaluations --, therefor.

On page 2, item (56), under "Other Publications", in column 1, line 13, delete "condidions," and insert -- conditions, --, therefor.

On page 2, item (56), under "Other Publications", in column 1, line 17, delete "sppech" and insert -- speech --, therefor.

On page 2, item (56), under "Other Publications", in column 1, line 20, delete "Proce." and insert -- Proc. --, therefor.

On page 2, item (56), under "Other Publications", in column 2, line 3, delete "Acousitics," and insert -- Acoustics, --, therefor.

On page 2, item (56), under "Other Publications", in column 2, line 36, delete "prerformance" and insert -- performance --, therefor.

On page 2, item (56), under "Other Publications", in column 2, line 39, delete "liklihood" and insert -- likelihood --, therefor.

On page 2, item (56), under "Other Publications", in column 2, line 52, delete "robustnessin" and insert -- robustness in --, therefor.

On page 2, item (56), under "Other Publications", in column 2, line 55, delete "normalizaiton" and insert -- normalization --, therefor.

In column 13, lines 22-33, delete
"As FIG. 3C illustrates, this final approximation is quite good at capturing the shape of $p(y|x,n)$. And, as discussed below, the Gaussian approximation along u can be leveraged to eliminate a significant amount of computation. Building the joint probability

Signed and Sealed this

Twenty-seventh Day of July, 2010

David J. Kappos
*Director of the United States Patent and Trademark Office*

The approximation for p(y|x,n) is complete, and is now combined with the priors p.sub.x(x) and p.sub.n(n) to produce the joint probability distribution. To conform to the approximation of the conditional observation probability, these prior distributions to the (u, v) coordinate space are transformed, and written as a Gaussian in u whose mean and variance are functions of v. EQ. 16"

and insert
-- As FIG. 3C illustrates, this final approximation is quite good at capturing the shape of p(y|x,n). And, as discussed below, the Gaussian approximation along u can be leveraged to eliminate a significant amount of computation.

Building the joint probability
The approximation for p(y|x,n) is complete, and is now combined with the priors p.sub.x(x) and p.sub.n(n) to produce the joint probability distribution. To conform to the approximation of the conditional observation probability, these prior distributions to the (u, v) coordinate space are transformed, and written as a Gaussian in u whose mean and variance are functions of v. EQ. 16 --, therefor.

In column 15, line 19, delete " $\Sigma_\alpha = \sigma^{\alpha 2}$ ." and insert -- $\Sigma_\alpha = \sigma_\alpha^2$ . --, therefor.

In column 16, line 54, delete "$\chi_o$" and insert -- $x_o$ --, therefor.

In column 18, line 42, in Claim 6, delete "wherein claim 4" and insert -- claim 4 wherein --, therefor.